(No Model.)
W. J. F. LIDDELL.
SHAFT COUPLING.
No. 274,795. Patented Mar. 27, 1883.
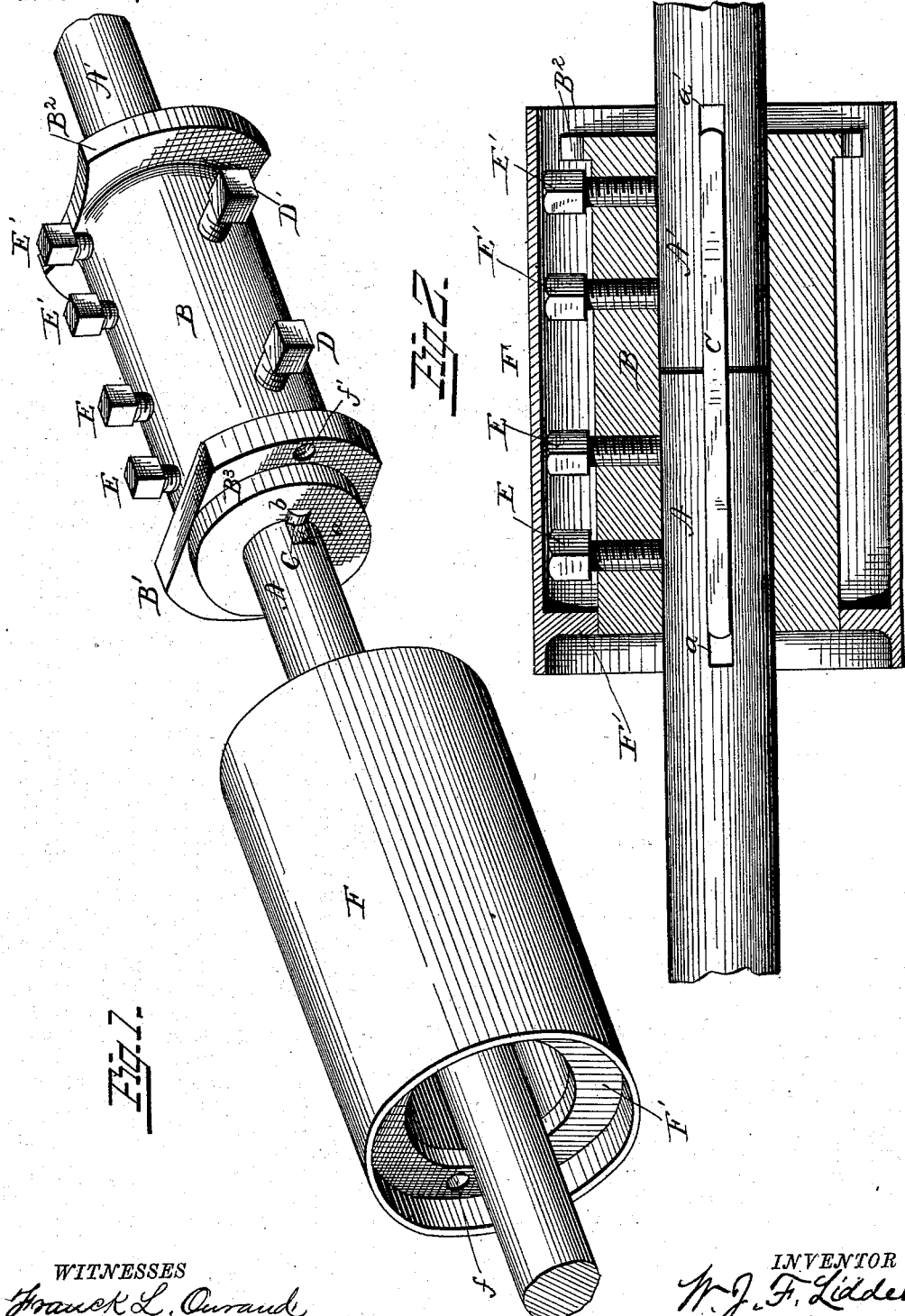
WITNESSES
Franck L. Ourand
Rex. Smith
INVENTOR
W. J. F. Liddell
by A. M. Smith
Attorney

United States Patent Office.

WALTER J. F. LIDDELL, OF CHARLOTTE, NORTH CAROLINA.

SHAFT-COUPLING.

SPECIFICATION forming part of Letters Patent No. 274,795, dated March 27, 1883.

Application filed December 9, 1882. (No model.)

*To all whom it may concern:*

Be it known that I, WALTER J. F. LIDDELL, of Charlotte, county of Mecklenburg, State of North Carolina, have invented a new and useful Improvement in Shaft-Couplings, of which the following is a full, clear, and exact description, reference being had to the accompanying drawings, making part of this specification.

My invention relates to a novel construction of coupling-sleeve, to the means for uniting the ends of the shaft thereto, and to the combination, with the said coupling-sleeve, of a covering sleeve or drum, which may serve the purpose of a band-wheel, if desired, as hereinafter explained.

In the accompanying drawings, Figure 1 represents a perspective view of my improved shaft-coupling, with the covering sleeve or drum removed on one side to show the arrangement of the parts; and Fig. 2 represents a longitudinal section through the coupling-sleeve and covering sleeve or drum, with the adjoining ends of the shaft in elevation.

A and A' represent the grooved end portions of the two shafts to be connected, and B the coupling-sleeve for uniting said shafts one to the other. This sleeve is provided with a longitudinal groove, $b$, on its inner face, extending from end to end, and in which is fitted an adjustable spline or feather, C, which projects and fits into the grooves $a$ and $a'$ in the adjoining ends A and A' of the shaft. The sleeve B is provided with screw-threaded perforations, in which are arranged set-screws D D', the inner ends of which rest and bear upon the spline C, and by the adjustment of which said spline or feather is forced to and firmly held on its seat in the grooves $a$ and $a'$, said screws being arranged near the ends of the sleeve, so as to hold the spline firmly, one to one portion, A, and the other to the other portion, A', of the jointed shaft. At about right angles to the perforations for the screws D D' are similar perforations provided with set-screws E E', four (more or less) in number, two being employed by preference for each end for coupling the ends A and A' to the sleeve, and preventing relative endwise movement of said ends therein. The sleeve is provided at its ends with annular or segmental flanges or collars B' and B², which project beyond the heads of the screws D and E, and form a support for the covering sleeve or drum F, being cut away on one or more sides, if desired, to reduce the weight of the sleeve. The drum F is provided with an internal annular flange, F', which surrounds and fits snugly on an end, B³, of the sleeve B, projecting beyond the collar B', and the latter, abutting snugly against the flange F', is firmly secured thereto by bolts or screws at $f$ and $f'$. The external sleeve, F, is intended to cover all projections—such as the fastening-screws D and E—which would be likely to injure any one coming in contact with them; but it will be apparent that it may be used under the construction shown and described as a driving drum or pulley from or to which motion may be communicated from or to the shaft, coupled as described.

Having now described my invention, what I claim as new is—

1. The grooved coupling-sleeve B, provided with the set-screws E and E', and the adjusting-screws D and D', in combination with the adjustable spline or feather C, for uniting the grooved ends of the jointed shaft and preventing relative rotary and endwise movement of said ends, substantially as described.

2. The flanged coupling-sleeve B, provided with the set-screws for uniting the ends of the shaft, in combination with the covering sleeve or drum F, secured to the said coupling-sleeve, substantially as and for the purpose described.

3. The flanged coupling-sleeve B, provided with the adjusting and set screws D and E, in combination with the removable covering-sleeve and the adjustable spline or feather $b$, substantially as and for the purpose set forth.

In testimony whereof I have hereunto set my hand this 4th day of December, A. D. 1882.

WALTER J. F. LIDDELL.

Witnesses:
WARREN C. STONE,
REX. SMITH.